US011462922B2

(12) United States Patent
Ahmed

(10) Patent No.: US 11,462,922 B2
(45) Date of Patent: Oct. 4, 2022

(54) POWER EFFICIENT SOLID-STATE COOLING WITH A NOVEL RECHARGEABLE CHEMICAL BATTERY SYSTEMS

(71) Applicant: Faizan Ahmed, San Jose, CA (US)

(72) Inventor: Faizan Ahmed, San Jose, CA (US)

( * ) Notice: Subject to any disclaimer, the term of this patent is extended or adjusted under 35 U.S.C. 154(b) by 546 days.

(21) Appl. No.: 16/584,761

(22) Filed: Sep. 26, 2019

(65) Prior Publication Data

US 2020/0161881 A1 May 21, 2020

Related U.S. Application Data

(63) Continuation-in-part of application No. 16/134,192, filed on Sep. 18, 2018, now Pat. No. 10,883,995, (Continued)

(51) Int. Cl.
*H02J 7/00* (2006.01)
*A61J 1/00* (2006.01)
(Continued)

(52) U.S. Cl.
CPC ............. *H02J 7/0042* (2013.01); *A61J 1/00* (2013.01); *H01M 10/44* (2013.01); (Continued)

(58) Field of Classification Search
CPC .. H02J 7/00; H02J 7/0042; A61J 1/00; H01M 10/44
(Continued)

(56) References Cited

U.S. PATENT DOCUMENTS

2008/0164265 A1* 7/2008 Conforti ............ B65D 81/3823
220/592.2
2013/0200063 A1* 8/2013 Cooke ..................... H05B 3/02
219/439
(Continued)

FOREIGN PATENT DOCUMENTS

JP 2016538521 A * 12/2016
KR 0110001881 U * 2/2011

*Primary Examiner* — Richard Isla
*Assistant Examiner* — Dung V Bui

(57) ABSTRACT

In one aspect, a thermoelectric anti-freeze block-based system includes a cartridge with a chemical battery comprising. The chemical battery for a gel material. The chemical battery uses the gel material to maintain an internal chamber of the cartridge at a specified temperature for a specified period of time, and the internal chamber of the cartridge, wherein the internal chamber comprises a sealable cylindrical cavity surrounded by the chemical battery. A vacuum-insulation thermos is provided that includes an internal chamber to hold the cartridge with the chemical battery. A charging station is provided that includes a thermoelectric anti-freeze block-based charging station includes a liquid pump. The liquid pump is connected through a bottom of the charging station where a thermoelectric cooler system is provided. The liquid pump comprises a radiator, a fan and an anti-freeze liquid material. The liquid pump circulates the anti-freeze liquid material inside the charging station and through the radiators. The circulated anti-freeze liquid material carries away the heat from a hot side of the thermoelectric cooler system. The cartridge with the chemical battery sits inside the charging station canister during the cooling process that cools the gel material within the chemical battery, and a power source that powers the liquid pump, the fan, and the radiator.

13 Claims, 14 Drawing Sheets

Related U.S. Application Data which is a continuation-in-part of application No. 15/939,267, filed on Mar. 28, 2018, now abandoned.

(60) Provisional application No. 62/811,523, filed on Feb. 27, 2019, provisional application No. 62/777,092, filed on Nov. 28, 2018, provisional application No. 62/477,598, filed on Mar. 28, 2017.

(51) Int. Cl.
| | | |
|---|---|---|
| *H01M 2/10* | (2006.01) | |
| *H01M 10/44* | (2006.01) | |
| *H01M 50/213* | (2021.01) | |
| *H01M 10/613* | (2014.01) | |
| *H01M 10/623* | (2014.01) | |

(52) U.S. Cl.
CPC ....... *H01M 10/443* (2013.01); *H01M 10/613* (2015.04); *H01M 10/623* (2015.04); *H01M 50/213* (2021.01); *A61J 2200/44* (2013.01); *H01M 2220/30* (2013.01)

(58) Field of Classification Search
USPC .......................................................... 320/150
See application file for complete search history.

(56) References Cited

U.S. PATENT DOCUMENTS

| | | | |
|---|---|---|---|
| 2014/0167676 A1* | 6/2014 | Mack ...................... | H02J 1/108 |
| | | | 320/108 |
| 2016/0023833 A1* | 1/2016 | Hallab .................. | B65D 81/022 |
| | | | 220/592.27 |
| 2020/0227936 A1* | 7/2020 | Kiritz ...................... | H02J 3/381 |

\* cited by examiner

```
┌─────────────────────────────────────────────────────────────────────────┐
│ BEFORE USING THE CHEMICAL BATTERY FILLED CARTRIDGE, THE USER CHARGES/COOLS SAID │
│           CARTRIDGE BY PLACING IT IN THE CHARGING STATION               │
│                                  1302                                   │
└─────────────────────────────────────────────────────────────────────────┘
                                     │
                                     ▼
┌─────────────────────────────────────────────────────────────────────────┐
│ ONCE CHARGE/COOL IS COMPLETE TO A DESIRED VALUE THEN THE USER CAN REMOVE THE │
│ CARTRIDGE FROM THE CHARGING STATION AND PLACE IT INSIDE THE VACUUM THERMOS │
│                                FOR USE                                  │
│                                 1304                                    │
└─────────────────────────────────────────────────────────────────────────┘
                                     │
                                     ▼
┌─────────────────────────────────────────────────────────────────────────┐
│   DETECT THAT THE CHARGE/COOL VALUE HAS DROPPED BELOW A SPECIFIED VALUE AND │
│ ISSUE A MESSAGE ON THE VACUUM THERMOS DISPLAY ASKING THE USER TO REMOVE THE │
│  CHEMICAL BATTERY FILLED CARTRIDGE AND CHARGE IT ON THE CHARGING STATION │
│                                 1306                                    │
└─────────────────────────────────────────────────────────────────────────┘
```

POWER EFFICIENT SOLID-STATE COOLING WITH A NOVEL RECHARGEABLE CHEMICAL BATTERY SYSTEMS

CLAIM OF PRIORITY

This application claims priority to and incorporates by reference U.S. Provisional Application No. 62/772,094, titled THERMO-ELECTRIC COOLER PUMP METHODS AND SYSTEMS, and filed on 28 Nov. 2018.

This application claims priority to and incorporates by reference U.S. Provisional Application No. 62/811,523, titled PORTABLE-SMART REFRIGERATOR METHODS AND SYSTEMS, and filed on 27 Feb. 2019.

This application claims priority to U.S. patent application Ser. No. 16/134,192 filed on Sep. 18, 2018. U.S. patent application Ser. No. 16/134,192 claims priority to U.S. patent application Ser. No. 15/939,267 filed on Mar. 28, 2018. U.S. patent application Ser. No. 15/939,267 claims priority to U.S. provisional patent application No. 62/477,598 filed on 28 Mar. 2017. These patent applications are hereby incorporated by reference in their entirety.

BACKGROUND

Field of the Invention

The invention is in the field of refrigeration and more specifically to a method, system and apparatus of recharging a portable refrigerator chemical battery.

Description of the Related Art

Medicines and other products can degrade in certain conditions. For example, some temperatures need to be maintained in specified temperature ranges. Patients may not be able to constantly track medicine temperature. The same can be true for some testing instruments such as blood testing strips. Portable refrigerators can solve these issues. However, effective portable refrigerators need effective components that are sufficient. Accordingly, improvements to thermo-electric cooler pump design and use are desired.

BRIEF SUMMARY OF THE INVENTION

In one aspect, a thermoelectric anti-freeze block-based system includes a cartridge with a chemical battery comprising. The chemical battery for a gel material. The chemical battery uses the gel material to maintain an internal chamber of the cartridge at a specified temperature for a specified period of time, and the internal chamber of the cartridge, wherein the internal chamber comprises a sealable cylindrical cavity surrounded by the chemical battery. A vacuum-insulation thermos is provided that includes an internal chamber to hold the cartridge with the chemical battery. A charging station is provided that includes a thermoelectric anti-freeze block-based charging station includes a liquid pump. The liquid pump is connected through a bottom of the charging station where a thermoelectric cooler system is provided. The liquid pump comprises a radiator, a fan and an anti-freeze liquid material. The liquid pump circulates the anti-freeze liquid material inside the charging station and through the radiators. The circulated anti-freeze liquid material carries away the heat from a hot side of the thermoelectric cooler system. The cartridge with the chemical battery sits inside the charging station canister during the cooling process that cools the gel material within the chemical battery, and a power source that powers the liquid pump, the fan, and the radiator.

BRIEF DESCRIPTION OF THE DRAWINGS

FIG. 13 illustrates an example process for charging/cooling a chemical battery filled cartridge using either the thermoelectric anti-freeze block-based system or the thermoelectric high contact pressure-based system, according to some embodiments.

Figure 1:
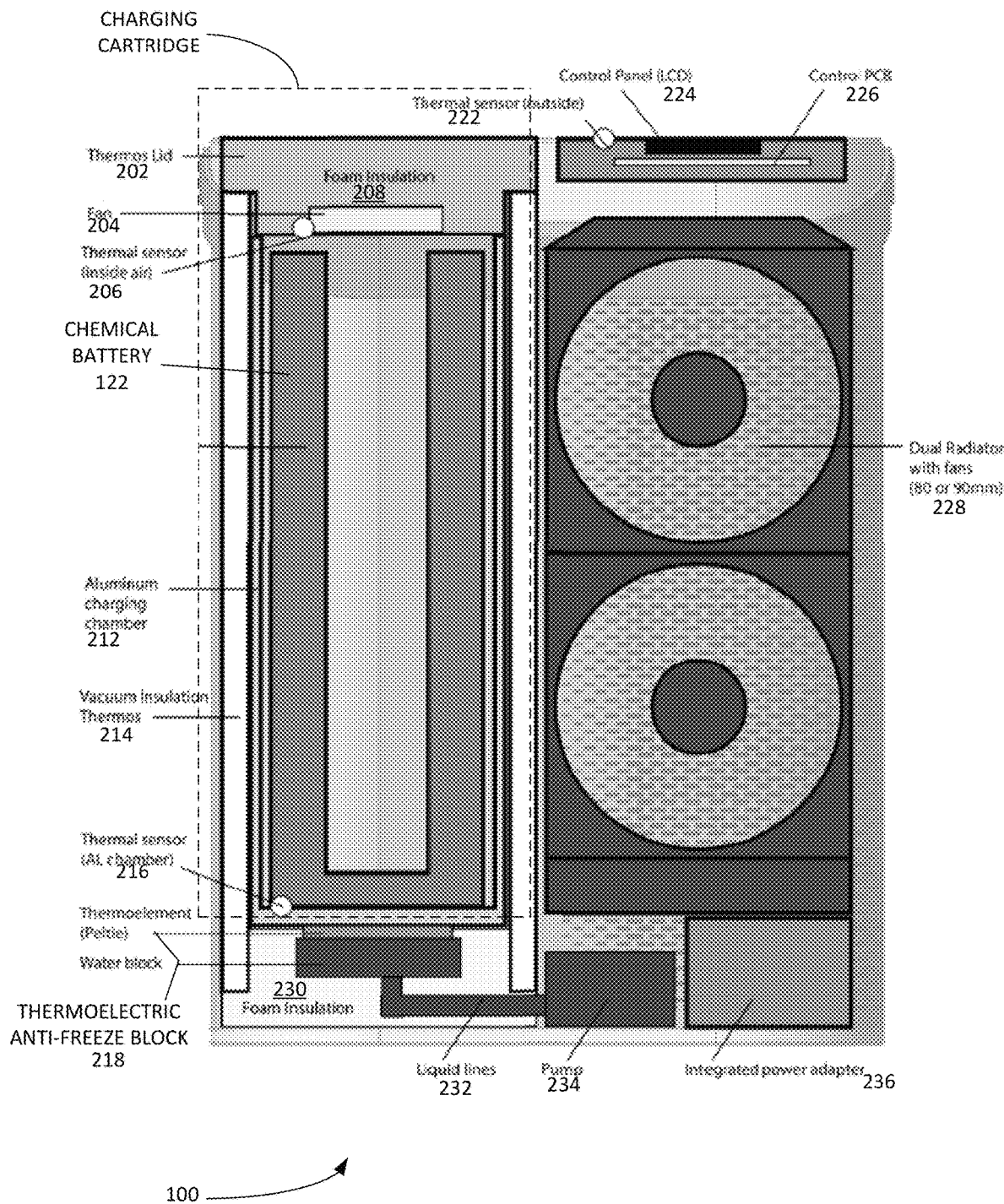
FIG. 1 illustrates an example of the thermoelectric anti-freeze block-based system with the chemical battery filled cartridge mounted in the charging/cooling station, according to some embodiments, according to some embodiments.
Figure 2:
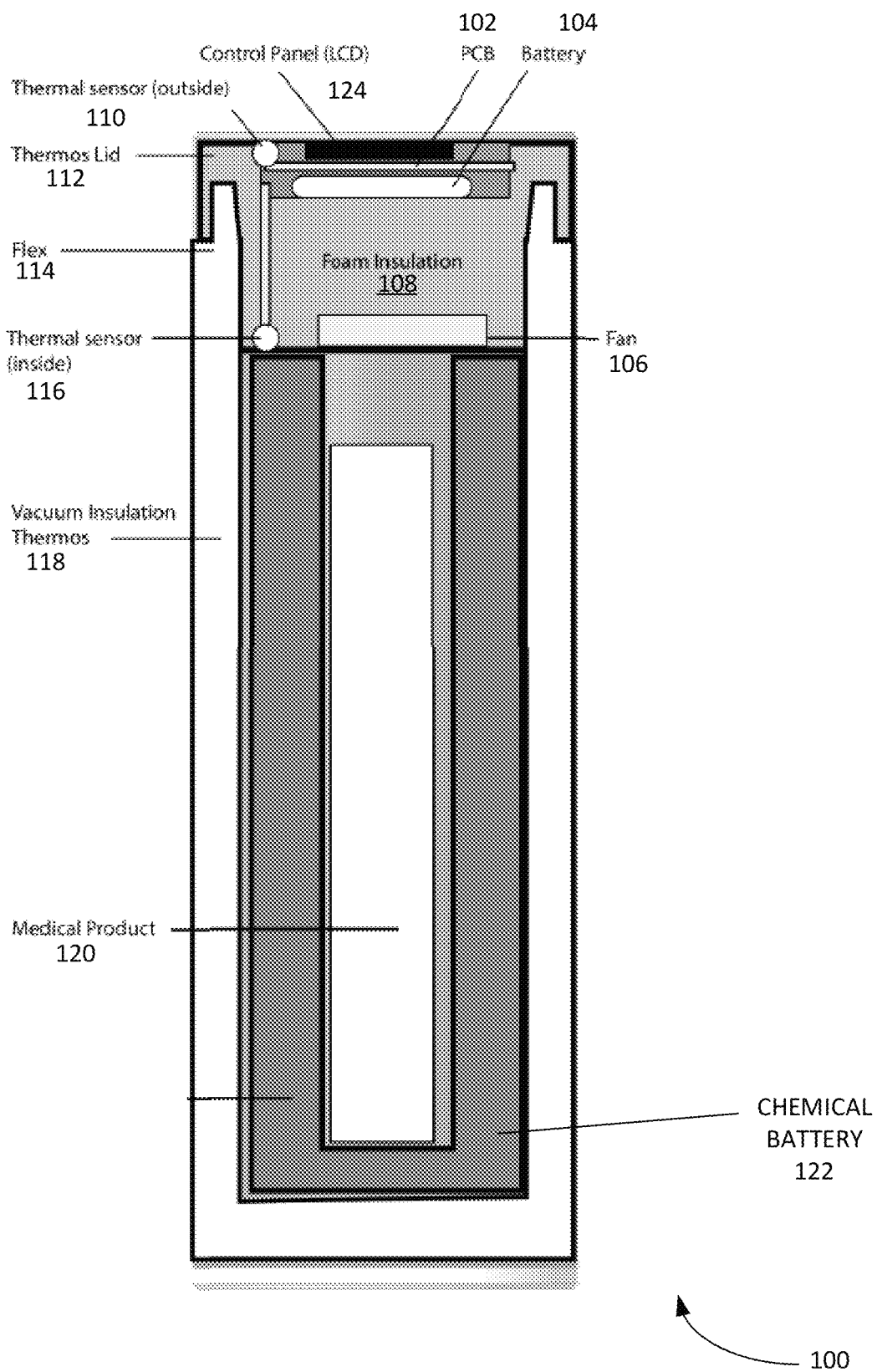
FIG. 2 is an example schematic view of a chemical battery filled cartridge in a vacuum thermos of the portable thermoelectric anti-freeze block-based system, according to some embodiments.

The Figures described above are a representative set and are not an exhaustive with respect to embodying the invention.

DESCRIPTION

Disclosed are a system, method, and article of manufacture for a portable power efficient solid state-based cooling system with a novel rechargeable chemical battery. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Acrylonitrile butadiene styrene (ABS) is a common plastic polymer.

Antifreeze is an additive which lowers the freezing point of a water-based liquid or gel.

High-density polyethylene (HDPE) or polyethylene high-density (PEHD) is a polyethylene thermoplastic made from petroleum.

Polypropylene (PP) is a thermoplastic polymer used in a wide variety of applications. It is produced via chain-growth polymerization from the monomer propylene.

Press fit or friction fit is a fastening between two parts which is achieved by friction after the parts are pushed together, rather than by any other means of fastening.

Printed circuit board (PCB) mechanically supports and electrically connects electronic components or electrical components using conductive tracks, pads and other features etched from one or more sheet layers of copper laminated onto and/or between sheet layers of a non-conductive substrate. Components can be soldered onto the PCB to both electrically connect and mechanically fasten them to it.

Temperature sensors can include mechanical temperature sensors, electrical temperature sensors, integrated circuit sensors, medometers, etc.

Thermoelectric effect is the direct conversion of temperature differences to electric voltage and vice versa via a thermocouple. A thermoelectric device creates voltage when there is a different temperature on each side. Conversely, when a voltage is applied to it, heat is transferred from one side to the other, creating a temperature difference. At the atomic scale, an applied temperature gradient causes charge carriers in the material to diffuse from the hot side to the cold side.

Example Portable Refrigerator Chemical Battery Recharging Schematics

FIG. 1 illustrates an example of the thermoelectric anti-freeze block-based system with the chemical battery filled cartridge 100 mounted in the charging/cooling station, according to some embodiments, according to some embodiments. Portable refrigerator cartridge can include a chemical battery. The chemical battery can include a gel material for maintaining an internal chamber at a specified temperature for a specified period of time. The chemical battery can include cartridge with chemical battery 122. Cartridge with chemical battery 122 can surround a sealable cylindrical cavity that holds medical product 120.

Cartridge with Chemical Battery 122 can be inside vacuum insulation thermos 118. Vacuum insulation thermos 118 can include flex 114. Vacuum insulation thermos 118 can be coupled with a thermos lid 112. Thermos lid 112 can include the following elements: foam insulation 108 and a temperature sensor/display system (e.g. elements 102, 104, 106, 110, 116, 124). PCB 102 can include the various processors and other computing systems to manage display 104, fan 106, temperature sensor 110 and temperature sensor 116. Temperature data can be obtained by temperature sensor 110 and temperature sensor 116. This temperature data can be displayed by control panel (LCD) 124. Fan 106 can be optional.

Thermoelectric Anti-Freeze Block Based Charging/Cooling Station Examples and Embodiments A thermoelectric anti-freeze block-based charging/cooling station is now discussed. In one example, the based charging station includes, a mobile unit that includes a cartridge and a thermos. The cartridge placed inside charging station and is charged/cooled to a specified temperature (e.g. two degrees centigrade) for a specified period of time (e.g. two and a half to three hours, etc.). The cartridge includes a chemical battery that can maintain the internal temperature of the cartridge contents for a specified period of time (e.g. thirty-five to thirty-nine hours, etc.) when the 35 to 39 hours at an ambient temperature. A liquid pump is included in the thermoelectric anti-freeze block-based charging station. The liquid pump can be connected through bottom of the charging station where a thermoelectric cooler is provided. The liquid pump can include a radiator, fans and an anti-freeze liquid material. The liquid pump circulates the anti-freeze liquid inside the charging station and through the radiators. The circulated anti-freeze liquid carries away the heat from the hot side of the thermoelectric cooler, and the chemical battery filled cartridge sitting inside the charging station canister is cooled accordingly.

The cartridge can include longitudinal fins along the interior surface. These can be coated with a thermo-conducting material (e.g. includes Copper) to promote conduction to pump heat out of the chemical battery occupying the space. Medicines are in basket that are placed in an internal cavity portion surrounded by the chemical battery space but separated by at least one interior cartridge surface. Example embodiments of various thermoelectric antifreeze block-based charging station and a mobile unit are provided in FIGS. 2-6 infra. Once the chemical battery is charged, the cartridge can be placed in the thermos.

FIG. 1 illustrates an example of portable refrigerator cartridge 100 mounted in a charging position with portable charging station 200, according to some embodiments. As shown, cartridge with chemical battery 122 is in contact with Aluminum charging chamber 212. Aluminum charging chamber 212 can include its own temperature sensor (e.g. Aluminum temperature sensor 216). It is noted that other materials than Aluminum can be used in other example embodiments.

Portable charging station 200 can include a pump 234 (e.g. a thermoelectric pump). Pump 234 can pump liquid 232 through thermoelectric anti-freeze block 220 (e.g. includes water block and a thermoelectric element). Thermoelectric anti-freeze block 220 can be enclosed in a foam insulation 230. Thermoelectric element can include a Peltier element. This action can cool the chemical battery (e.g. cooling the cartridge with chemical battery 122). Pump 234 can be powered by a power source that includes an integrated power adapter 236. Heat transfers can be managed using dual power fans 228. For example, dual power fans 228 can be used to dissipate heat into an ambient environment.

Portable charging station 200 can include a temperature sensor/display system (e.g. elements control display (LCD) 224, 226, etc.). PCB 226 can include the various processors and other computing systems to manage LCD display 224, fans 228, temperature sensor (outside) 222 and temperature sensor (thermoelectric element) 216. Temperature data can be obtained by temperature sensor 222 and temperature sensor 216. This temperature data can be displayed by LCD display 224. Portable charging station 200 can be used as a desktop device.

Figure 3:
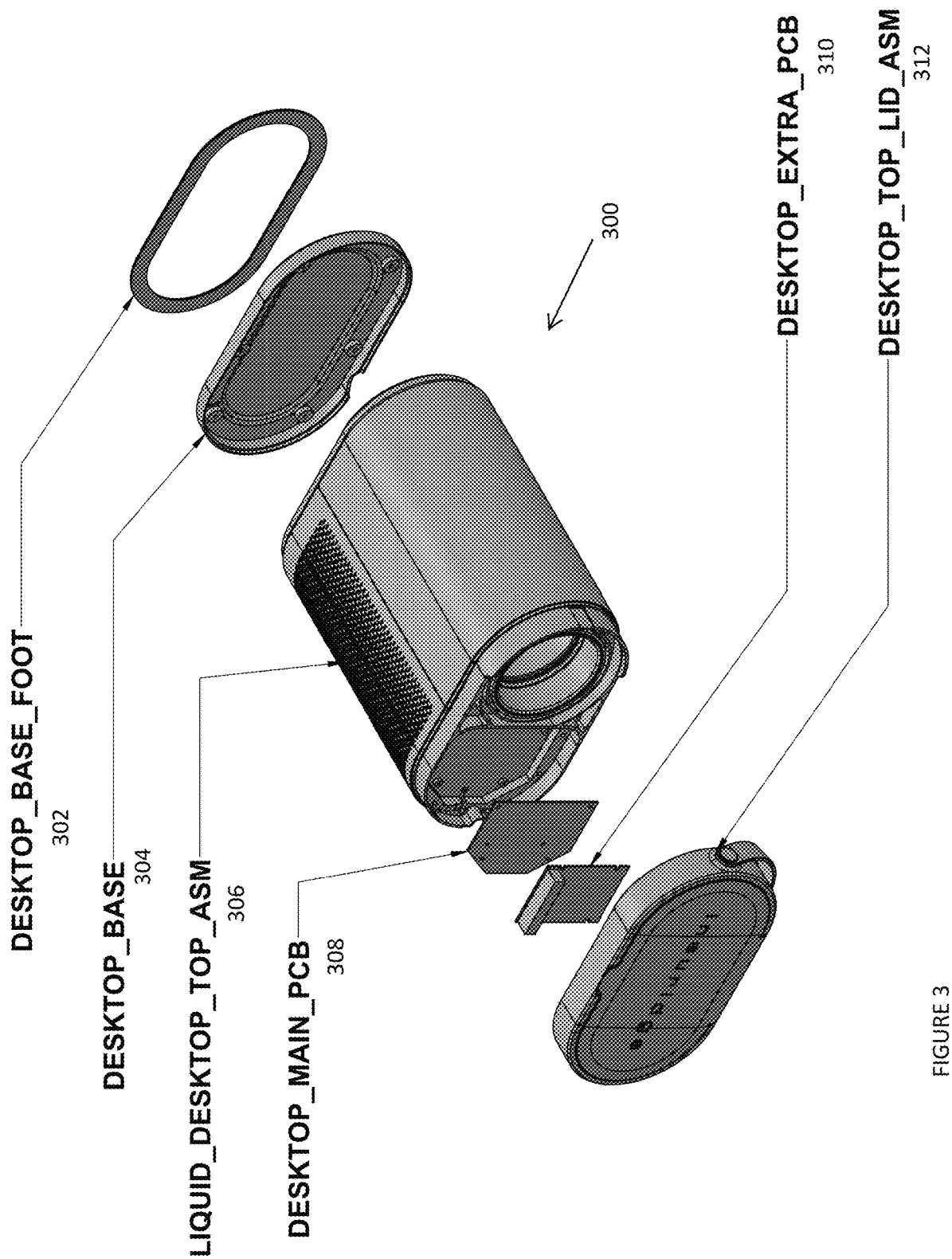
FIG. 3 is an exploded view of the charging/cooling station of the portable thermoelectric anti-freeze block-based system, according to some embodiments.

FIG. 3 is an example exploded view of a thermoelectric antifreeze block-based charging station 300, according to some embodiments. The thermoelectric antifreeze block-based charging station 300 can be used to implement an example embodiments of a portable charging station 200. The thermoelectric antifreeze block-based charging station 300 can include desktop base foot 302. Desktop base foot 302 can be coupled with desktop base 304 to provide a standing support for the portable charging station. Liquid desktop top assembly 306 can include fans, pump (e.g. a thermo-electric pump), etc. of the portable charging station. As discussed in the example of FIG. 1, various computing systems (e.g. desktop main PCB 308, desktop extra PCB 310, etc. can be included to obtain system information (e.g. battery power, temperature sensor data, etc.) and manage the operations (e.g. chemical battery charging, etc.) of the portable charging station. Additionally, a desktop top lid assembly 312 can be included to protect LCD displays.

Figure 4:
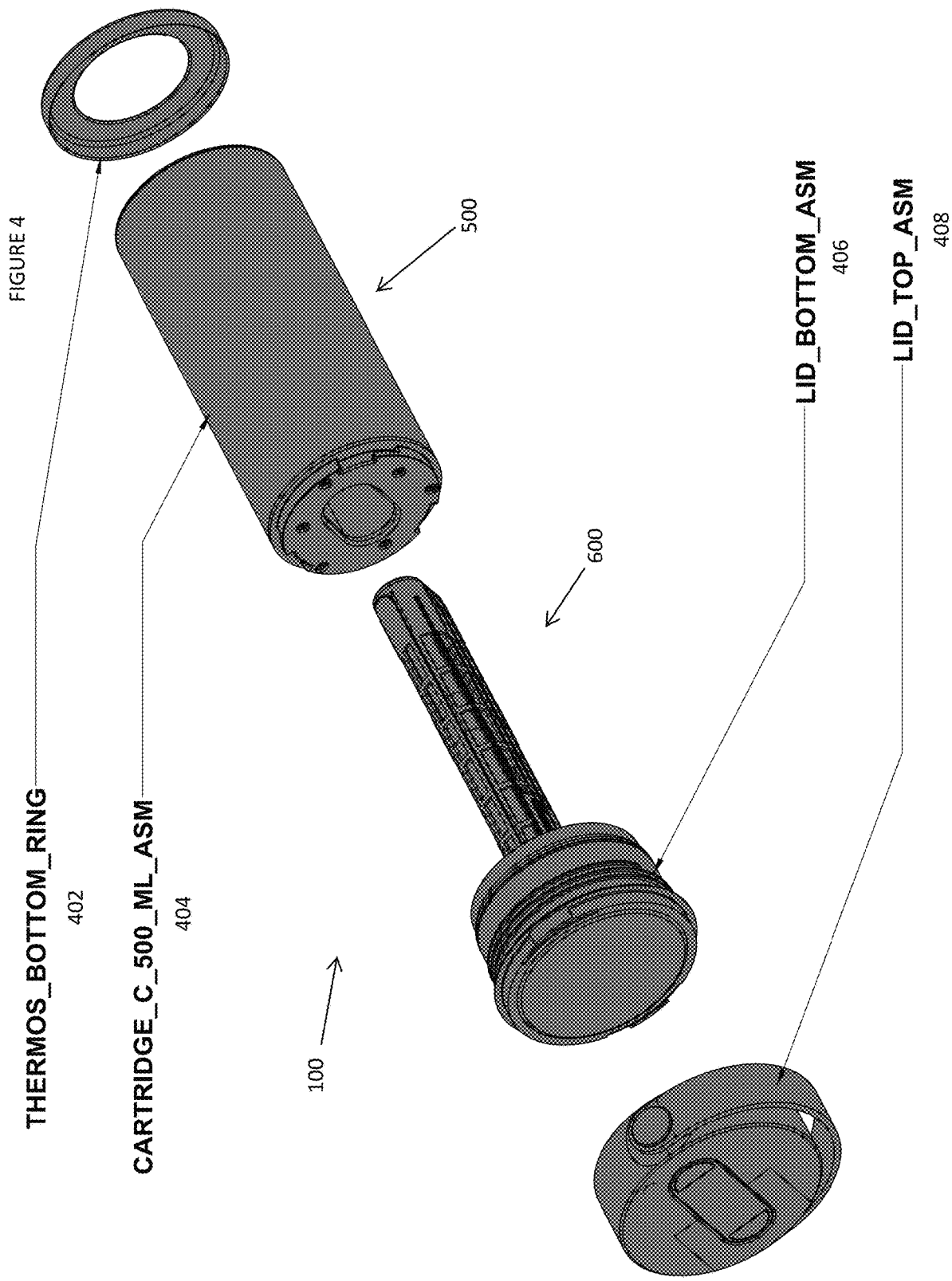
FIG. 4 illustrate an example product basket and chemical battery cartridge of a portable refrigerator cartridge, according to some embodiments.

FIG. 4 illustrate an example product basket 600 and chemical battery cartridge 500 of a portable refrigerator cartridge 100, according to some embodiments. Additional information and views of product basket 600 and chemical battery cartridge 700 are provided infra in FIGS. 5 and 6 respectively. As shown, portable refrigerator cartridge 100 can include, inter alia: a thermos bottom ring 402, a cartridge assembly 404 (e.g. 500 ml in volume, etc.), lid bottom assembly 406, and/or a lid top assembly 408.

Figure 5:
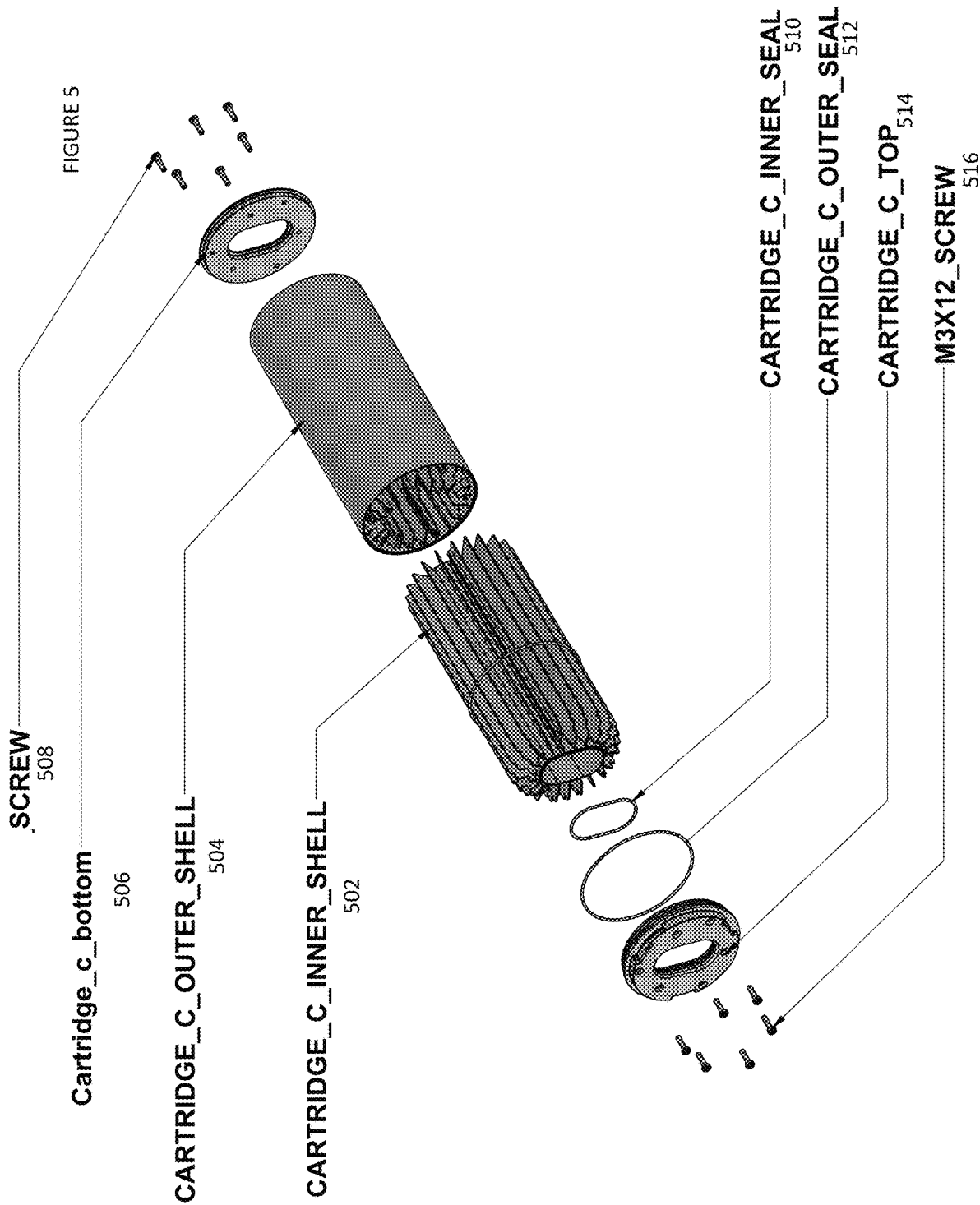
FIG. 5 illustrates an example exploded view of a chemical battery cartridge, according to some embodiments.

FIG. 5 illustrates an example exploded view of a chemical battery cartridge 500, according to some embodiments. Cartridge bottom 506 can be attached to cartridge outer shell 504 with screws 508. Cartridge inner shell 502 can be inside cartridge outer shell 504. Cartridge inner shell 502 can include fins as shown. The fins can be coated with a thermo-conducting material to promote conduction to cool the liquid/cell material of the chemical battery. Cartridge inner shell 502 can include an internal cavity for receiving product basket 600 and medicines to be maintained at a specified cool temperature (e.g. two degree centigrade, etc.) for a specified period (e.g. one hour and thirty minutes, etc.). The contents of product basket 600 do not come into contact with the material of the chemical battery.

Cartridge inner seal 510 can be attached to cartridge outer seal 512, cartridge top 514 with screws 516. Cartridge outer seal 512 can also include fins as shown. The fins can be coated to promote conduction to pump heat out of the material of the chemical battery that surrounds the medicine storage area. For example, medicines are in a basket that is inserted into the thermos portion in the metal cavity that is surrounded by the cooled chemical battery.

Figure 6:
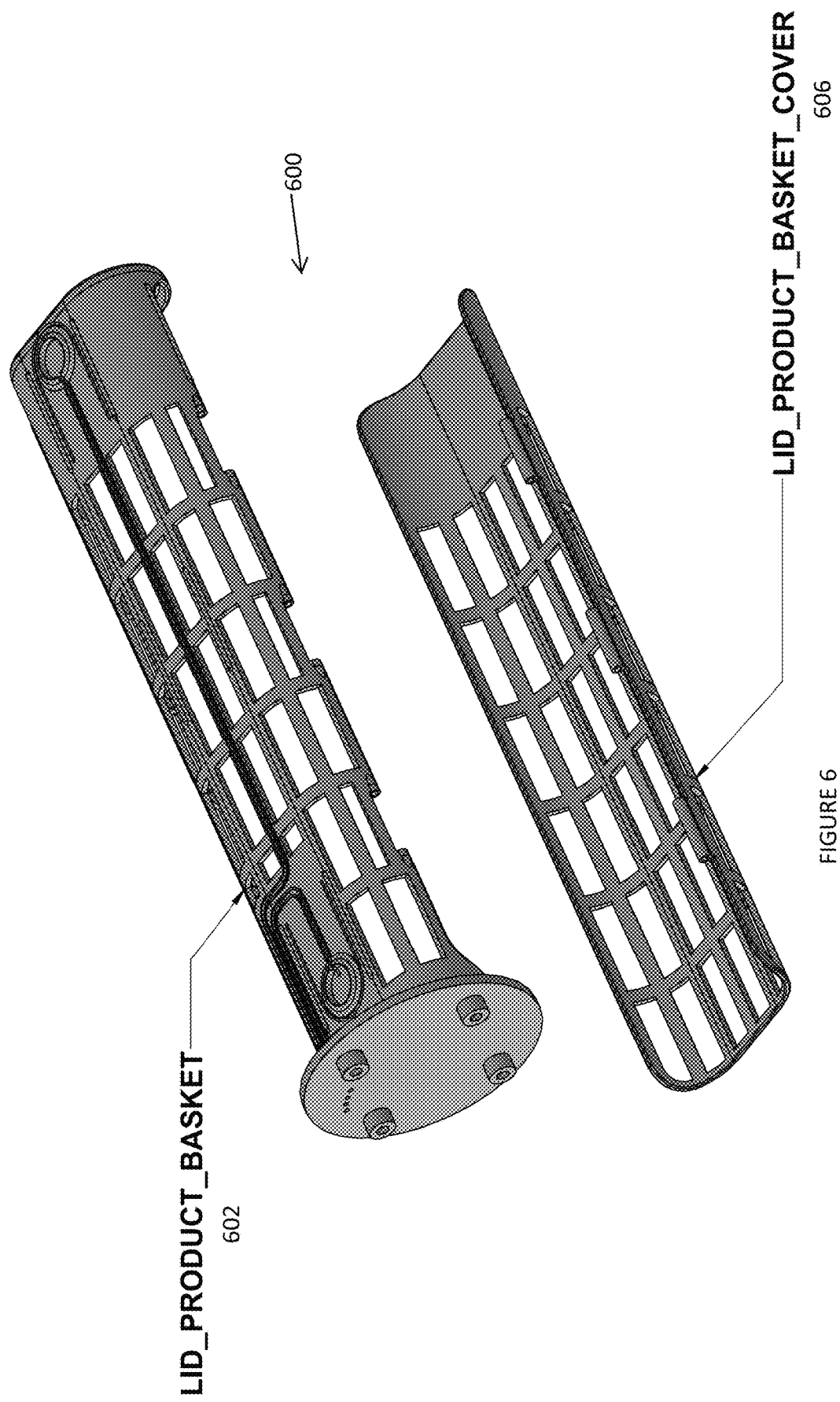
FIG. 6 illustrates an example exploded view of a product basket, according to some embodiments.

FIG. 6 illustrates an example exploded view of a product basket 600, according to some embodiments. Product basket 600 can be used to provide the thermos discussed herein. As shown, product basket 600 can include lid product basket 602 and lid product basket cover 606. Medicine and/or other products to be kept at a specified cool temperature can be placed in the product basket 600. Product basket 600 can then be placed in a central cavity of chemical battery cartridge 500.

Thermoelectric High Contact Pressure Based Charging/Cooling Station Example Embodiments Thermoelectric high contact pressure-based charging/cooling station embodiments are now provided. It is noted that the mobile unit that includes a cartridge and a thermos provided supra can be modified for use with a thermoelectric high contact pressure based portable system. Thermoelectric high contact pressure-based charging station can use a dual Thermoelectric cooler system to with air from a dual fan system to cool the cartridge. In this way, the charging of the cartridge's chemical battery is implemented through two Thermoelectric plates that are connected through heat sinks with fans behind them.

Figure 7:
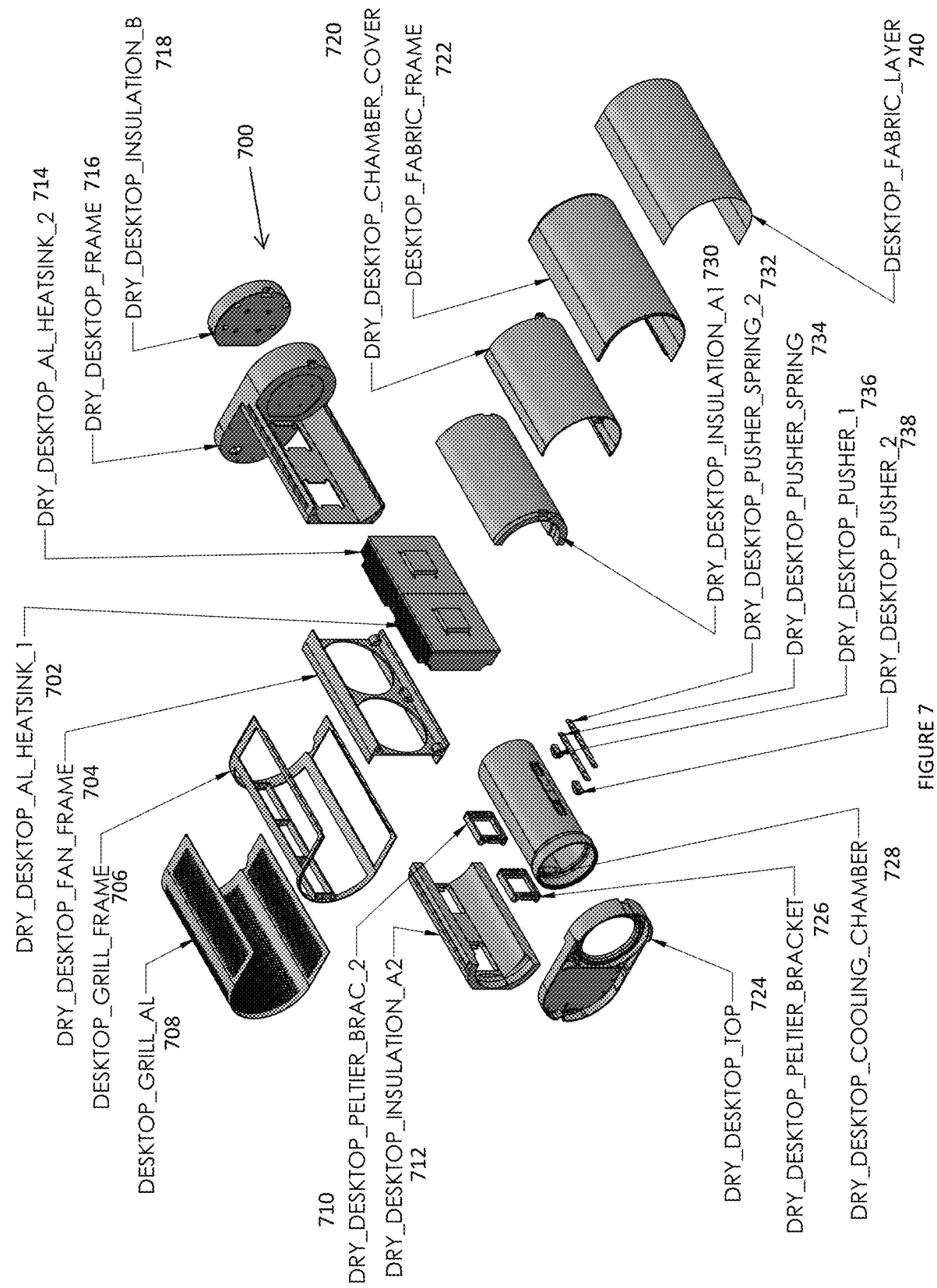
FIG. 7 illustrates an example exploded view of the charging/cooling station of the portable thermoelectric high contact pressure-based system, according to some embodiments.

FIG. 7 illustrates an example exploded view of a thermoelectric high contact pressure-based charging station 700, according to some embodiments. Thermoelectric high contact pressure-based charging station 700 can be used to cool the chemical battery 122. Thermoelectric high contact pressure-based charging station 700 can include a dry desktop heatsinks 702 and 714. Dry desktop heatsinks 702 and 714 can include a pair of Thermoelectric cooling plates. Dry desktop heatsink 702 and 714 can cool the chemical battery 122 by conducting heat from the chemical battery 122 while the Thermoelectric effect cools the chemical battery 122. Dry desktop heatsinks 702 and 714 can include, inter alia:

dry desktop fan frame 704, desktop grill frame 706, dry desktop Peltier bracket 710, etc. that are assembled as shown.

As shown, the thermoelectric high contact pressure based charging station charging station 700 can include an assembly of, inter alia: dry desktop insulation 712, dry desktop frame 716, dry desktop insulation 718, dry desktop chamber cover 720, desktop fabric frame 722, dry desktop top 724, dry desktop Peltier bracket 726, dry desktop cooling chamber 728, dry desktop insulation 720, dry desktop pusher spring 732, dry desktop pusher spring 734, dry desktop pusher 736, dry desktop pusher 738, desktop fabric layer 740, etc.

Figure 8:
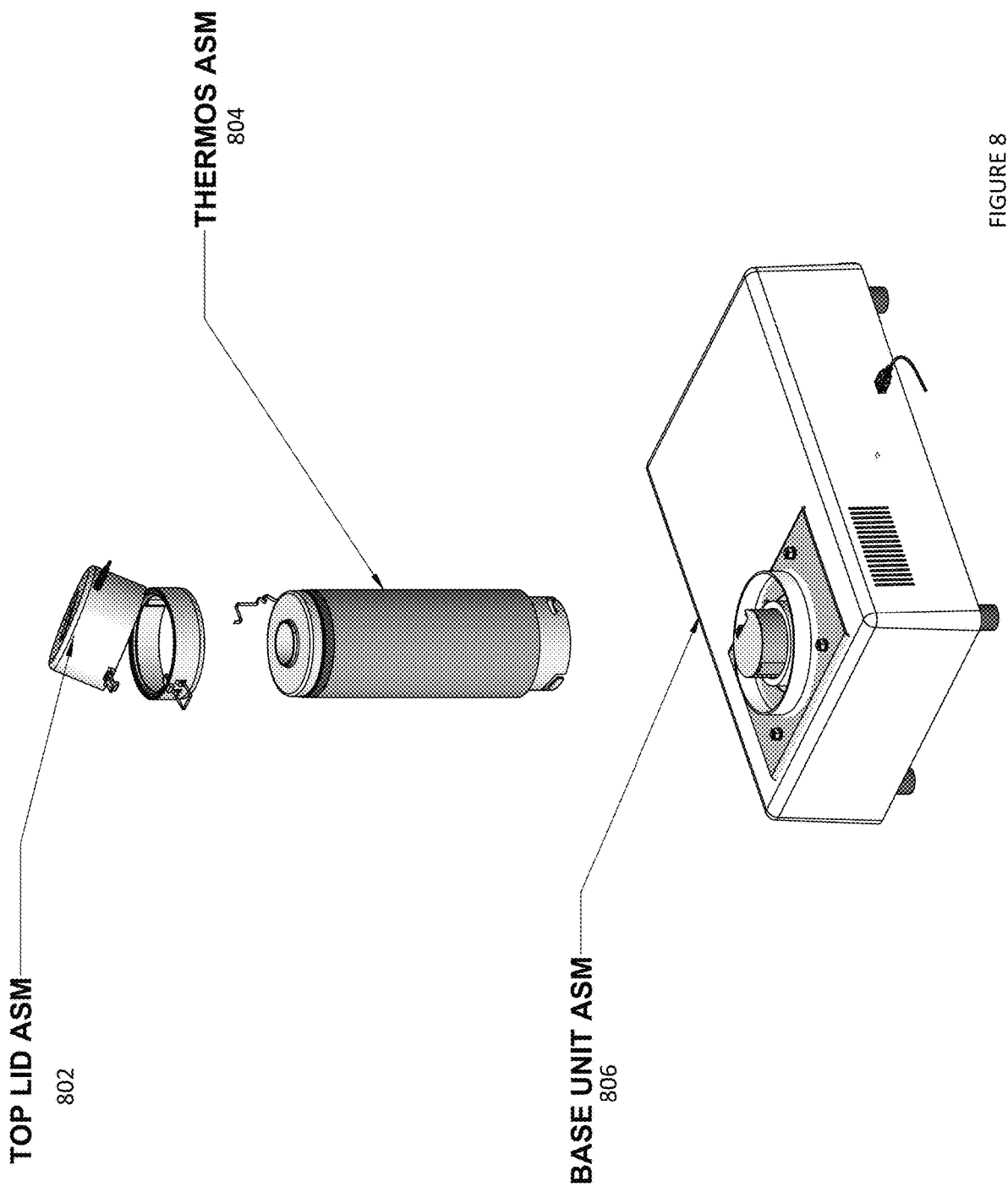
FIG. 8 illustrates an example of the thermoelectric metal to metal contact based portable system, according to some embodiments.

Thermoelectric Metal to Metal Contact Based Charging/Cooling Station Example Embodiments FIG. 8 illustrates another example portable refrigerator charging system-thermoelectric metal to metal contact based portable system 800, according to some embodiments. Thermoelectric metal to metal contact based portable system 800 can include a top lid assembly 802, a thermos assembly 804 and a base unit assembly 806. Additional descriptions of the thermos assembly 804 and the base unit assembly 806 are provided infra.

Figure 9:
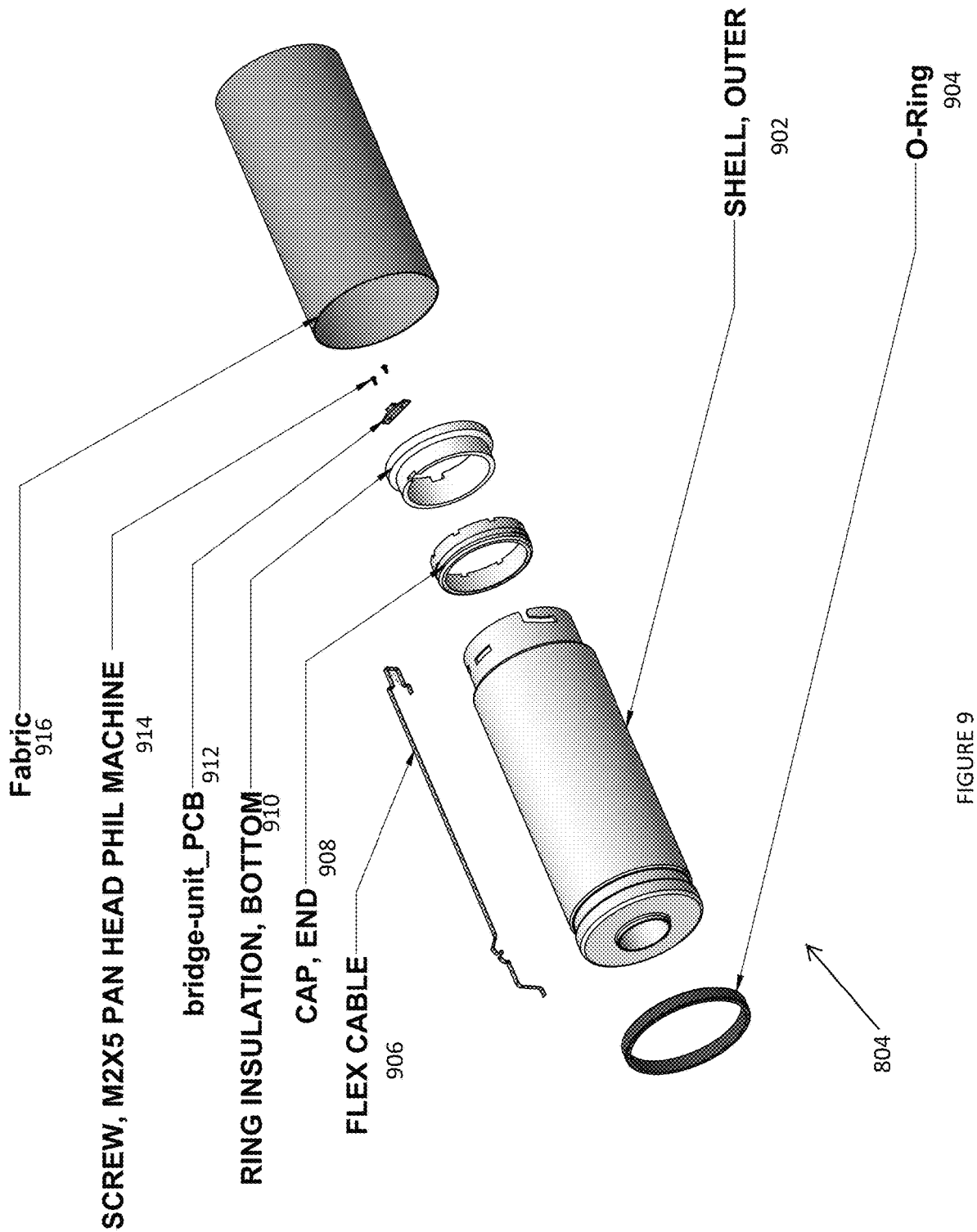
FIG. 9 illustrates an example exploded view of the chemical battery filled cartridge embedded thermos assembly of the thermoelectric metal to metal contact based portable system, according to some embodiments.

FIG. 9 illustrates an example exploded view of thermos assembly 804, according to some embodiments. Thermos assembly 804 includes an outer shell 902. Outer shell 902 includes an O-ring 904 and a longitudinal flex cable 906. At the lower end, outer shell 902 is coupled with an end cap 908, bottom ring insulation 910, bridge-unit PCB 912, screw(s) 914, etc. A fabric cover 916 can be placed on the exterior of outer shell 902.

Figure 10:
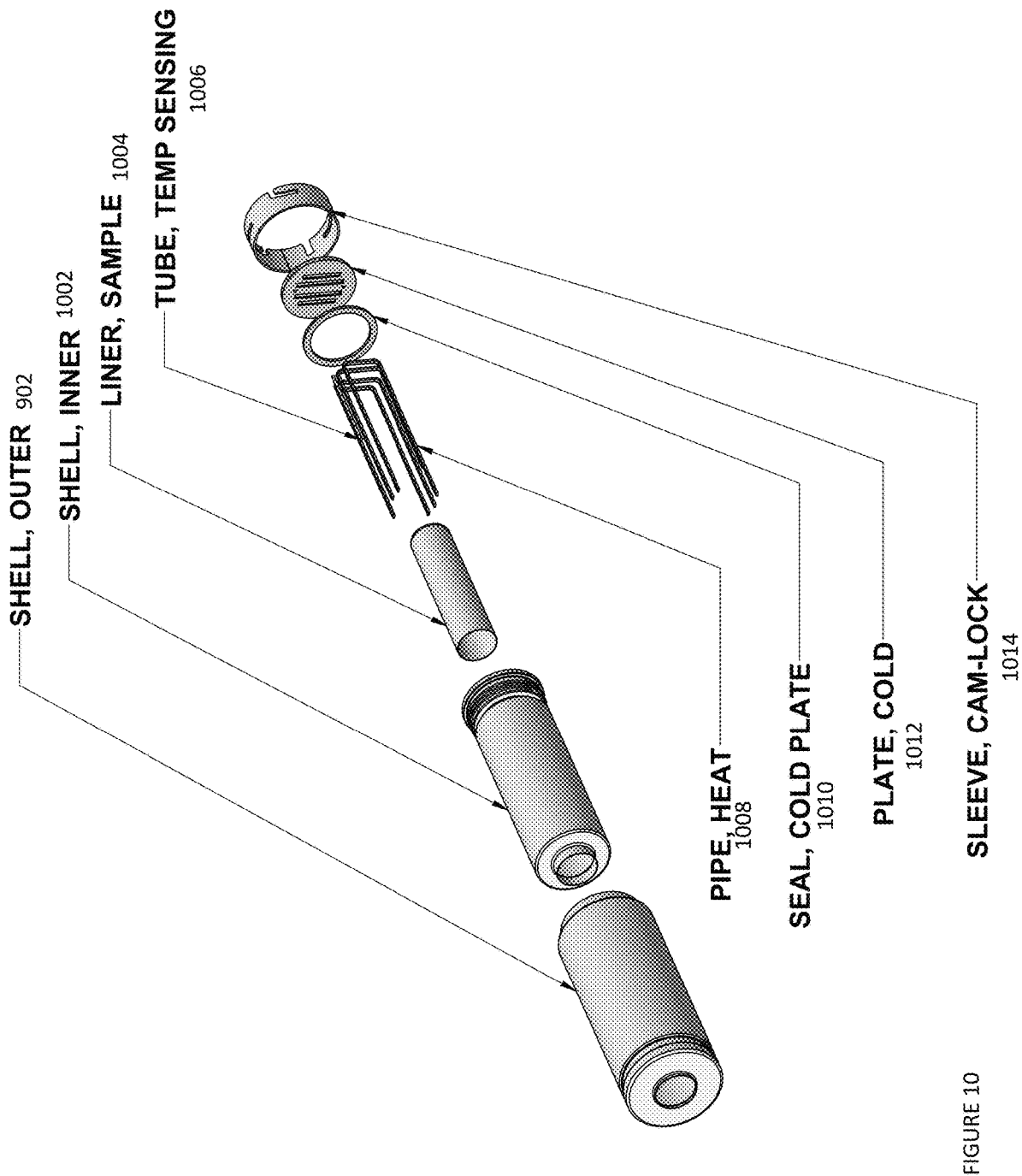
FIG. 10 illustrates an example exploded view of the interior portion of the chemical battery filled cartridge embedded thermos assembly of the thermoelectric metal to metal contact based portable system, according to some embodiments.

FIG. 10 illustrates an example exploded view of an interior portion of outer shell 902, according to some embodiments. As shown, outer shell 902 can include an INNER shell 1002. A seal liner 1004 is placed within the inner shell 1002. Temperature sensing tube(s) 1006 and heat pipe(s) 1008 can be located within inner shell 1002 as well. sensing tube(s) 1006 and heat pipe(s) 1008 can be held within inner shell 1002 by, inter alia: cold plate seal, cold plate, cam-lock sleeve, etc.

Figure 11:
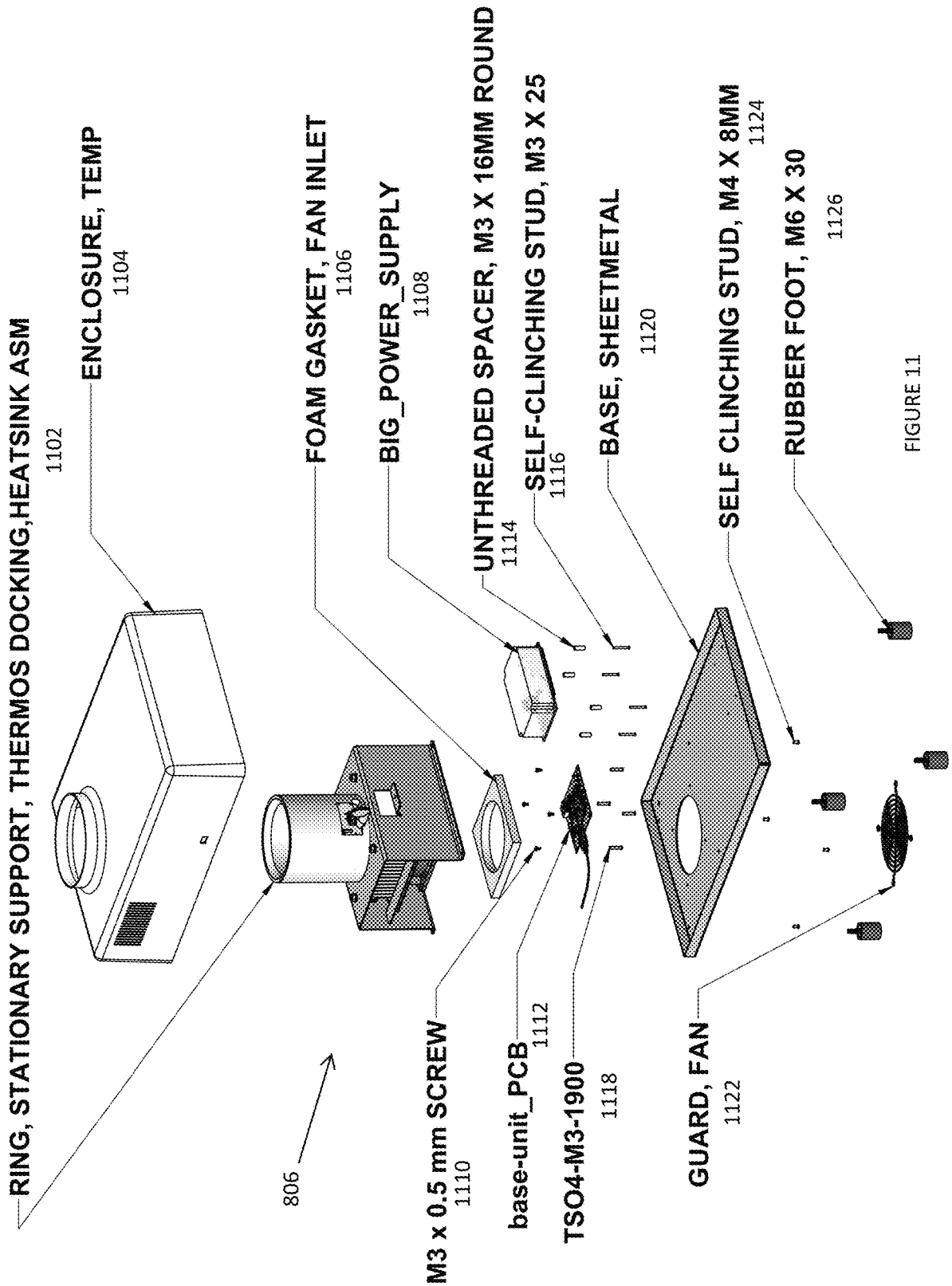
FIG. 11 illustrates an example exploded view of the charging/cooling station of the portable thermoelectric metal to metal contact based portable system, according to some embodiments.

FIG. 11 illustrates an example exploded view of a base unit assembly 806, according to some embodiments. Base unit assembly 806 can include ring, stationary support, thermos docking, heatsink assembly 1102, temp enclosure 1104, foam gasket, fan inlet 1106, power supply 1108, screw(s) 1110, base-unit PCB 1112, unthreaded spacer, m3×16 mm round 1114, self-clinching stud 1116, tso4-m3-1900 1118, base, sheet metal 1120, fan guard 1122, self-clinching stud 1124, rubber foot 1126, etc.

Figure 12:
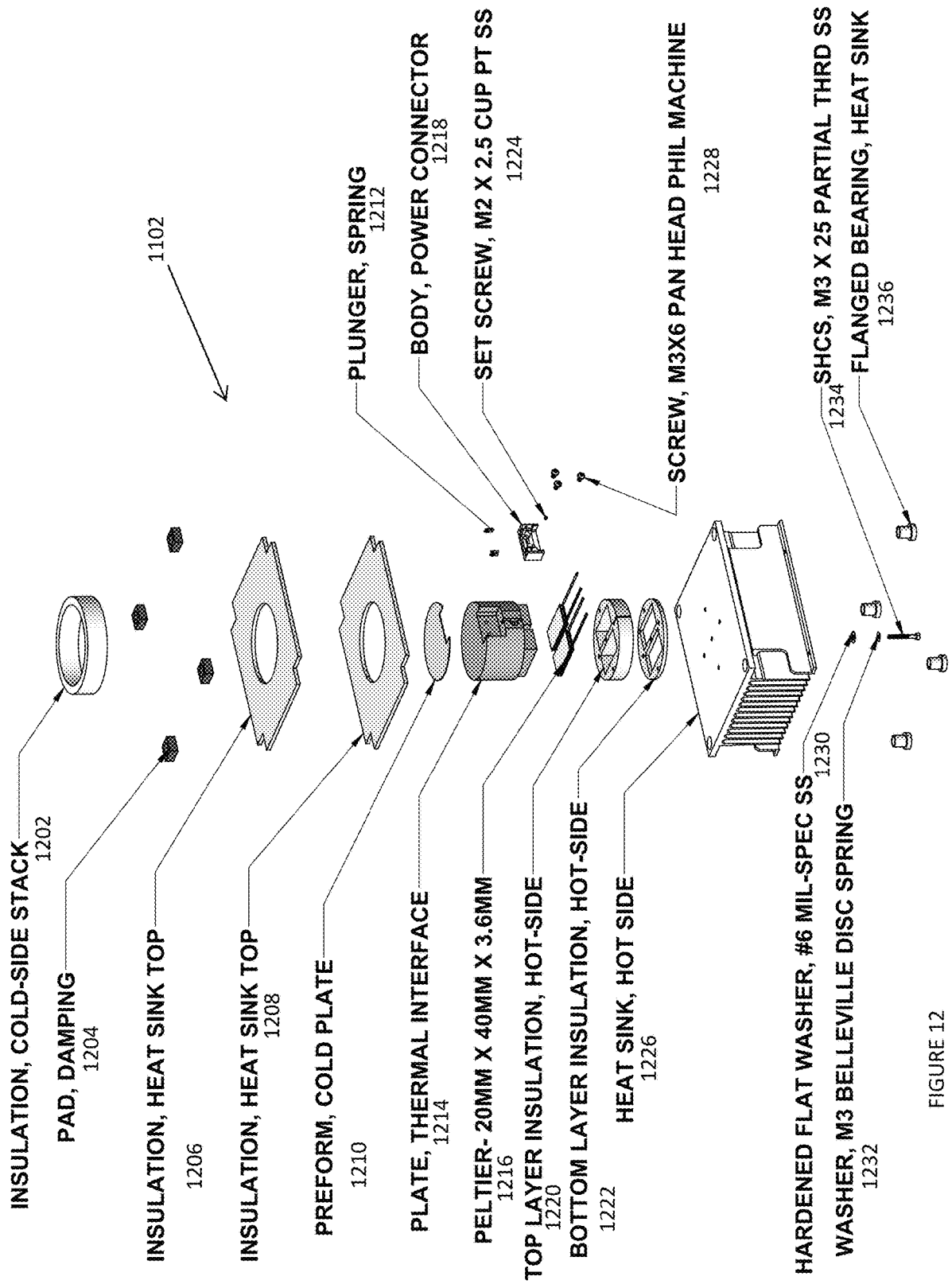
FIG. 12 illustrates an example exploded view of a ring, stationary support, thermos docking, heatsink assembly of the thermoelectric metal to metal contact based portable charging/cooling station, according to some embodiments.

FIG. 12 illustrates an example exploded view of a ring, stationary support, thermos docking, heatsink assembly 1102, according to some embodiments. Ring, stationary support, thermos docking, heatsink assembly 1102 includes, inter alia: Insulation, cold-side stack 1202, pad, damping 1204, insulation, heat sink top 1206, insulation, heat sink top 1208, preform, cold plate 1210, plunger, spring 1212 plate, thermal interface 1214, Peltier plate 1216 (e.g. 20 mm×40 mm×3.6 mm), body, power connector 1218, top layer insulation, hot-side 1220, bottom layer insulation, hot-side 1222 screw set 1224, heat sink, hot side 1226, screw 1228, hardened flat washer 1230, washer 1232, SHCS 1234, flanged bearing, heat sink 1236, etc.

Example Portable-Solid State Cooling Charging Method
FIG. 13 illustrates an example process for charging/cooling a chemical battery filled cartridge in either the thermoelectric antifreeze block-based system or the thermoelectric high contact pressure-based system, according to some embodiments. In step 1302, before using the chemical battery filled cartridge, the user charges said cartridge. The cartridge is placed inside the charging station to charge for a specified period of time (e.g. two to three (2-3) hours, etc.). Charging here refers to setting the temperature to a specified temperature (e.g. two (2) degrees C.°, etc.).

In step 1304, once charge/cool is complete to a desired value then the user can remove the cartridge from the charging station and place it inside the vacuum thermos for use. In step 1306, detect that the charge/cool value has dropped below a specified value and issue a message on the vacuum thermos display asking the user to remove the chemical battery filled cartridge and charge it on the charging station.

Example Computer Architecture And Systems

Figure 14:
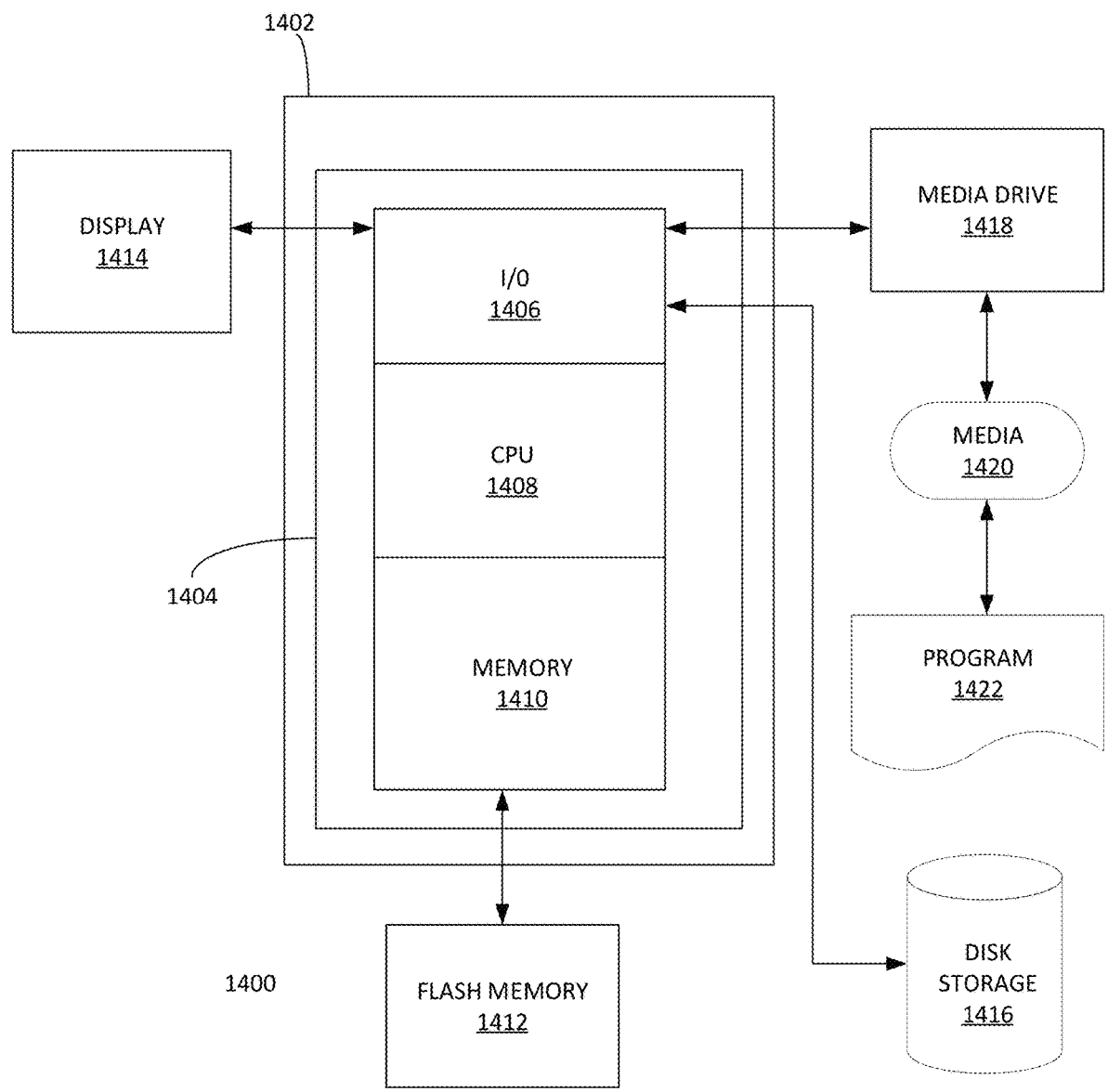
FIG. 14 is a block diagram of a sample computing environment that can be utilized to implement various embodiments.

FIG. 14 depicts an exemplary computing system 1400 that can be configured to perform any one of the processes provided herein. In this context, computing system 1400 may include, for example, a processor, memory, storage, and I/O devices (e.g., monitor, keyboard, disk drive, Internet connection, etc.). However, computing system 1400 may include circuitry or other specialized hardware for carrying out some or all aspects of the processes. In some operational settings, computing system 1400 may be configured as a system that includes one or more units, each of which is configured to carry out some aspects of the processes either in software, hardware, or some combination thereof.

FIG. 14 depicts computing system 1400 with a number of components that may be used to perform any of the processes described herein. The main system 1402 includes a motherboard 1404 having an I/O section 1406, one or more central processing units (CPU) 1408, and a memory section 1410, which may have a flash memory card 1412 related to it. The I/O section 1406 can be connected to a display 1414, a keyboard and/or other user input (not shown), a disk storage unit 1416, and a media drive unit 1418. The media drive unit 1418 can read/write a computer-readable medium 1420, which can contain programs 1422 and/or data. Computing system 1400 can include a web browser. Moreover, it is noted that computing system 1400 can be configured to include additional systems in order to fulfill various functionalities. Computing system 1400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Thermoelectric Cooling Pump Embodiment

The portable smart refrigerator can include a thermoelectric cooler pump as provided in U.S. patent application Ser. No. 16/523,827, titled THERMO-ELECTRIC COOLER PUMP METHODS AND SYSTEMS and filed on 26 Jul. 2019, which is incorporated herein by reference in its entirety. Thermo-electric cooler pump (not shown) includes a liquid pump with integrated chiller and heater. This liquid can be pushed through coiling assembly. The liquid pump with integrated chiller includes four components. The case component seals the liquid so that the liquid does not escape except by the inlet port and exit port which are also formed by case.

The motor component situated outside of the case, is not wetted by the liquid, and is fixed to the case by attachments such as screws. A shaft of the motor enters the case through a sealed hole.

The impeller is contained within the case. The impeller is wetted by the liquid. The impeller is attached to shaft such that the motion of motor is transferred to impeller causing it to move. The movement of impeller causes liquid to enter the inlet port and move toward the exit port. The movement of the liquid is directed from inlet to exit port by the geometry of case and impeller. The chiller/heater is fixed to the case by attachments such as screws. Chiller/Heater penetrates the case such that one part of chiller/heater is inside the case and is wetted by liquid while the other part of chiller/heater is outside of the case and is dry. There is a seal around chiller/heater so that liquid does not escape in the vicinity of the chiller/heater. Chiller/Heater converts electron flow to thermal heat transfer by means of the Peltier effect. When electrons are made to flow in the positive direction, the wetted side of chiller/heater is driven to lower temperatures and the dry side to higher temperature. The Peltier effect causes heat to flow from cold side to hot side and is reversible with a reversal in electron flow.

Thermo-electric cooler pump can be managed by a computing system in the portable smart refrigerator. The computing system can be coupled with an exterior display. Exterior display can display various parameters (e.g. temperature, batter power, etc.) of the portable smart refrigerator. Computing system can also be coupled with various other systems such as, inter alia: temperature sensors, digital clocks, Wi-Fi systems, etc.

In one example, a charging station includes a variation of the thermoelectric cooling pump. Upon application of power, the thermoelectric cooling pump cools one side and consequently the other side increases in heat. The heated side has the heat driven away by means of a pump and a liquid that carries the heat. The heat is then dissipated it into the air through attached radiators. The top plate of the thermoelectric pump is welded to an aluminum chamber. The pump cools the chamber. The chamber cools the cartridge placed inside of it.

The cartridge can be a cylinder with a specified-sized compartment in the center area. The compartment serves the purpose of the inner chamber. Commodities (e.g. medicines, etc.) that need to be cooled are placed in the inner chamber via product basket. The walls of the cartridge can be filled with a specified chemical that aids in temperature maintenance of the commodities. The cartridge charges at the charging station for a specified period of time (e.g. two to three hours, etc.). When placed inside the mobile-device's vacuum flask, the cartridge allows the mobile device to operate for a specified period of time at a specified temperature (e.g. two to eight degrees centigrade).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States Patent:

1. A thermoelectric anti-freeze block-based system comprising:
    a cartridge with a chemical battery comprising:
    the chemical battery comprising a gel material, wherein the chemical battery uses the gel material to maintain an internal chamber of the cartridge at a specified temperature for a specified period of time, and
    the internal chamber of the cartridge, wherein the internal chamber of the cartridge comprises a sealable cylindrical cavity surrounded by the chemical battery;
    a vacuum-insulation thermos that includes an internal chamber to hold the cartridge with the chemical battery;
    a charging station that comprises:
    a thermoelectric anti-freeze block-based charging station comprising:
    a liquid pump, wherein the liquid pump is connected through a bottom of the charging station where a thermoelectric cooler system is provided, wherein the liquid pump comprises a radiator, a fan and an anti-freeze liquid material, wherein the liquid pump circulates the anti-freeze liquid material inside the charging station and through the radiator, wherein the circulated anti-freeze liquid material carries away heat from a hot side of the thermoelectric cooler system, and wherein the cartridge with the chemical battery sits inside a charging station canister during a cooling process that cools the gel material within the chemical battery, and
    a power source that powers the liquid pump, the fan, and the radiator.

2. The thermoelectric anti-freeze block-based system of claim 1, wherein the internal chamber of the cartridge holds a medical product.

3. The thermoelectric anti-freeze block-based system of claim 2,
    wherein a plurality of temperature sensors are coupled with the cartridge with the chemical battery at a specified set of locations, and
    wherein the plurality of temperature sensors obtain temperature data.

4. The thermoelectric anti-freeze block-based system of claim 3, wherein the vacuum insulation thermos further comprises:
    a thermos lid comprising a foam insulation and a temperature sensor-display system, and
    wherein the temperature sensor-display system is coupled with the plurality of temperature sensors and displays the temperature data.

5. The thermoelectric anti-freeze block-based system of claim 4, wherein an interior surface of a chamber that holds the chemical battery comprises a plurality of longitudinal fins along the interior surface.

6. The thermoelectric anti-freeze block-based system of claim 5, wherein the plurality of longitudinal fins are coated with a thermo-conducting material.

7. The thermoelectric anti-freeze block-based system of claim 6, wherein the thermo-conducting material comprises a copper alloy.

8. The thermoelectric anti-freeze block-based system of claim 7, wherein the internal chamber further comprises a receiving product basket for holding the medicine product.

9. A thermoelectric high contact pressure-based charging station comprising:
- a mobile unit comprising:
- a cartridge unit comprising:
- a chemical battery comprising a gel material, wherein the chemical battery uses the gel material to maintain an internal chamber of the cartridge at a specified temperature for a specified period of time, and
- the internal chamber of the cartridge, wherein the internal chamber of the cartridge comprises a sealable cylindrical cavity surrounded by the chemical battery;
- a vacuum-insulation thermos comprising a chamber that holds the cartridge with the chemical battery and the internal chamber;
- a charging station that comprises:
- a dual thermoelectric cooler system that receives air from a dual fan system to cool the cartridge.

10. The thermoelectric high contact pressure-based charging station of claim 9 comprising:
- a pair of heatsinks to dissipate heat extracted from the chemical battery during a cooling process.

11. The thermoelectric high contact pressure-based charging station of claim 10 comprising:
- a pair of thermoelectric cooling plates.

12. The thermoelectric high contact pressure-based charging station of claim 11, wherein the pair of thermoelectric cooling plates cool the chemical battery by conducting heat from the chemical battery while a thermoelectric effect cools the chemical battery.

13. A method for charging a chemical battery-filled cartridge in either a thermoelectric antifreeze block-based system or a thermoelectric high contact pressure-based system comprising:
- before using the chemical battery filled cartridge, a user charges said cartridge by placing the cartridge inside a charging station to charge for a specified period of time;
- once charge is complete to a desired value, removing the cartridge from the charging station and place the cartridge inside a vacuum thermos for use;
- detecting that a charge/cool value has dropped below a specified value and issue a message on a computerized display of the vacuum thermos that displays a request to the user to remove the chemical battery-filled cartridge and re-charge the chemical battery-filled cartridge on the charging station.

* * * * *